United States Patent
Zebuhr

(10) Patent No.: US 9,962,626 B2
(45) Date of Patent: May 8, 2018

(54) COMPOUND DISTILLER

(71) Applicant: Aquaback Technologies, Inc., Tewksbury, MA (US)

(72) Inventor: William H. Zebuhr, Nashua, NH (US)

(73) Assignee: Aquaback Technologies, Inc., Salem, NH (US)

( * ) Notice: Subject to any disclaimer, the term of this patent is extended or adjusted under 35 U.S.C. 154(b) by 340 days.

(21) Appl. No.: 14/718,699

(22) Filed: May 21, 2015

(65) Prior Publication Data
US 2015/0336024 A1  Nov. 26, 2015

Related U.S. Application Data

(60) Provisional application No. 62/001,959, filed on May 22, 2014.

(51) Int. Cl.
*B01D 3/14* (2006.01)
*C02F 1/04* (2006.01)
(Continued)

(52) U.S. Cl.
CPC ............ *B01D 3/146* (2013.01); *B01D 1/225* (2013.01); *B01D 1/2887* (2013.01); *B01D 3/065* (2013.01);
(Continued)

(58) Field of Classification Search
CPC ...... B01D 1/225; B01D 1/2887; B01D 3/065; B01D 3/146; C02F 1/041; C02F 1/042; C02F 1/048
See application file for complete search history.

(56) References Cited

U.S. PATENT DOCUMENTS 3,136,707 A * 6/1964 Hickman ............... B01D 1/225
                                                        159/24.1
3,285,834 A    11/1966 Guerrieri et al.
(Continued)

FOREIGN PATENT DOCUMENTS

WO    WO 2015/179638 A2    11/2015

OTHER PUBLICATIONS

Notification Concerning Transmittal of International Preliminary Report on Patentability, Int'l. Application No. PCT/US2015/031970, entitled "Compound Distiller", filed May 21, 2015, dated Dec. 1, 2016.
(Continued)

*Primary Examiner* — Jonathan Miller
(74) *Attorney, Agent, or Firm* — Hamilton Brook Smith & Reynolds, P.C.

(57) ABSTRACT

A distiller for processing liquid influent, including a heating chamber. An evaporation arrangement can be positioned above the heating chamber and can include spaced apart evaporation surfaces forming a bottom evaporation stage, multiple intermediate evaporation stages, and an upper evaporation stage. The bottom evaporation stage can be in thermal contact with the heating chamber, and the multiple intermediate and upper evaporation stages can be sequentially positioned above the bottom evaporation stage one above another. The bottom and intermediate evaporation stages can evaporate at least a portion of the liquid influent applied thereon forming vapor and heating the stage positioned above with the vapor. A liquid delivery system can provide the liquid influent to the upper evaporation stage for initial evaporation, and transfer at least a portion of the liquid influent in the upper evaporation stage and intermediate evaporation stages downwardly in sequence to a stage below until reaching the bottom evaporation stage for (Continued)

sequential evaporation at each evaporation stage. A solids transfer system can move solids on an evaporation surface of the bottom evaporation stage remaining from evaporated liquid influent to the heating chamber for combustion and providing heat.

18 Claims, 18 Drawing Sheets

(51) Int. Cl.
  *B01D 1/22* (2006.01)
  *B01D 1/28* (2006.01)
  *B01D 3/06* (2006.01)

(52) U.S. Cl.
  CPC .............. *C02F 1/041* (2013.01); *C02F 1/042* (2013.01); *C02F 1/048* (2013.01)

(56) References Cited

U.S. PATENT DOCUMENTS

| | | | |
|---|---|---|---|
| 3,329,583 A | 7/1967 | Othmer | |
| 3,446,712 A * | 5/1969 | Othmer | C02F 1/16 159/15 |
| 4,270,974 A | 6/1981 | Greenfield et al. | |
| 4,276,115 A | 6/1981 | Greenfield et al. | |
| 4,586,985 A | 5/1986 | Ciocca et al. | |
| 4,702,798 A * | 10/1987 | Bonanno | B01D 1/26 159/17.1 |
| 5,154,599 A * | 10/1992 | Wunning | F23B 90/06 110/204 |
| 8,858,758 B2 | 10/2014 | Zebuhr | |
| 2012/0037488 A1 | 2/2012 | Zebuhr | |
| 2015/0075967 A1 * | 3/2015 | Zebuhr | B01D 1/2893 203/11 |
| 2016/0002065 A1 | 1/2016 | Zebuhr | |

OTHER PUBLICATIONS

International Preliminary Report on Patentability, Int'l. Application No. PCT/US2015/031970, entitled "Compound Distiller", filed May 21, 2015, dated Nov. 22, 2016.

Invitation to Pay Additional Fees for Application No. PCT/US2015/031970; dated Sep. 18, 2015; Entitled: "Compound Distiller".

Notification of Transmittal of the International Search Report and the Written Opinion of the International Searching Authority for Application No. PCT/US2015/031970; dated Dec. 16, 2015; Entitled: "Compound Distiller".

\* cited by examiner

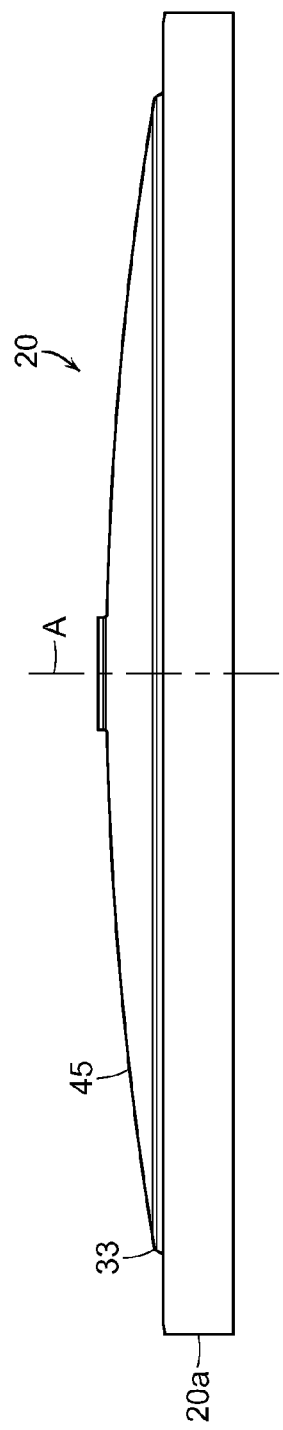
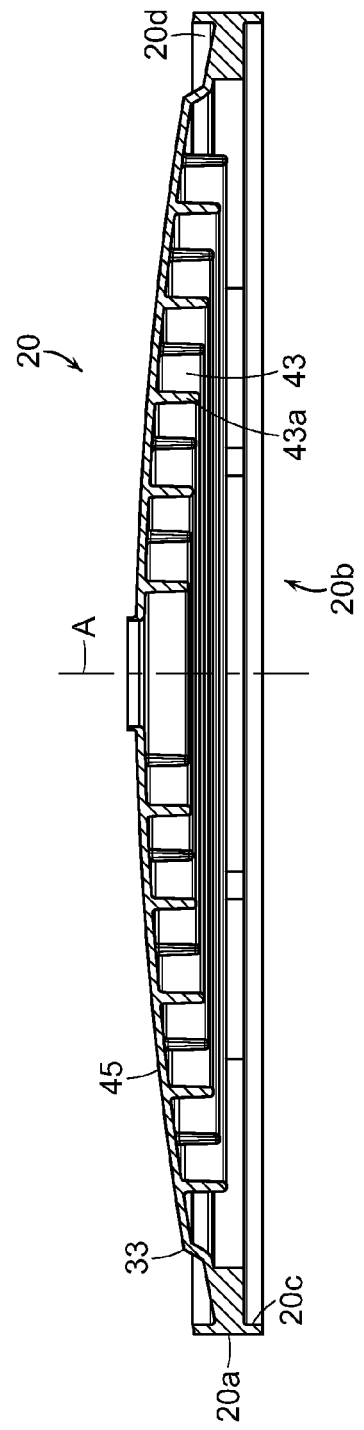

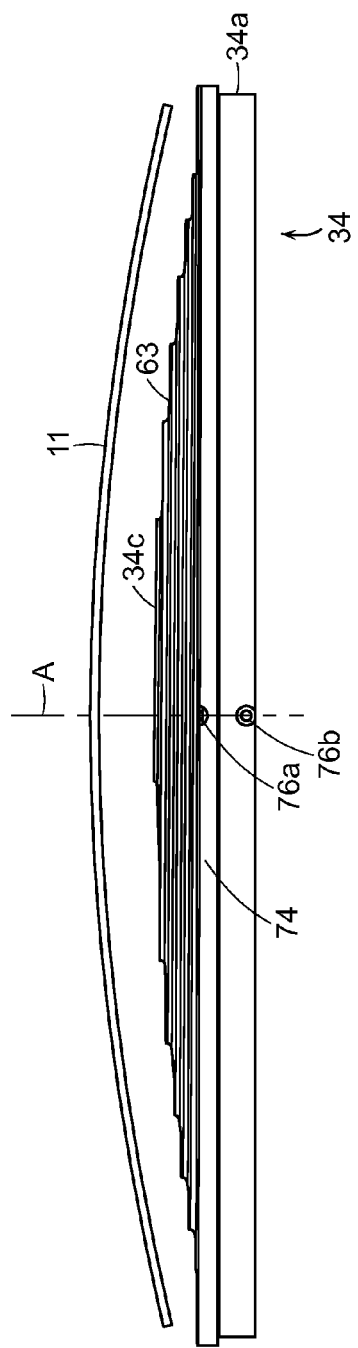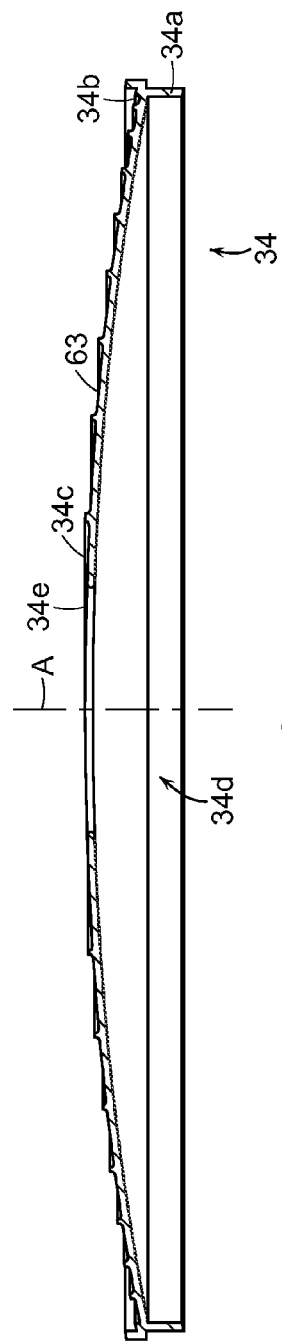
FIG. 14
FIG. 15

COMPOUND DISTILLER

RELATED APPLICATION

This application claims the benefit of U.S. Provisional Application No. 62/001,959, filed on May 22, 2014. The entire teachings of the above application are incorporated herein by reference.

BACKGROUND OF THE INVENTION

Current vapor compression distillers can process influent or wastewater to provide distillate water, but a typical byproduct is also a quantity of water containing a high concentration of contaminants or solids, which needs to be disposed of. As a result, a portion of the water is not purified. In addition, the contaminants must be disposed of properly.

SUMMARY OF THE INVENTION

The present invention can provide a distilling device, apparatus or arrangement that can process water containing high concentrations of contaminants or solids to provide a higher yield of processed water in an efficient manner. The present invention can provide a distiller for processing liquid influent, and can include a heating chamber. An evaporation arrangement can be positioned above the heating chamber and can include spaced apart evaporation surfaces forming a bottom evaporation stage, multiple intermediate evaporation stages, and an upper evaporation stage. The bottom evaporation stage can be in thermal contact with the heating chamber, and the multiple intermediate and upper evaporation stages can be sequentially positioned above the bottom evaporation stage one above another. The bottom and intermediate evaporation stages can evaporate at least a portion of the liquid influent applied thereon forming vapor and heating the stage positioned above with the vapor. A liquid delivery system can provide the liquid influent to the upper evaporation stage for initial evaporation, and transfer at least a portion of the liquid influent in the upper evaporation stage and intermediate evaporation stages downwardly in sequence to a stage below until reaching the bottom evaporation stage for sequential evaporation at each evaporation stage. A solids transfer system can move solids on an evaporation surface of the bottom evaporation stage remaining from evaporated liquid influent to the heating chamber for combustion and providing heat.

In particular embodiments, at least some of the evaporation stages each can include lower condensing surfaces for condensing vapor and upper evaporation surfaces heated by the vapor and for evaporating liquid influent thereon. Wiping members can wipe or scrape at least one of the liquid influent or solids on at least some of the upper evaporation surfaces for spreading or transfer. The lower condensing surfaces can include a spiral pattern that narrows moving radially outwardly for condensing the vapor into distillate for removal. The bottom evaporation stage can include a transfer port for delivering solids from the upper evaporation surface of the bottom evaporation stage to the heating chamber. The liquid delivery system can include a series of pumps for delivering the liquid influent to selected evaporation stages. A rotatable shaft can extend along an upright axis through the evaporation arrangement for rotating the wiping members and driving the pumps. The heating chamber can include a heating member or element for providing initial heating of the heating chamber, and a combustion chamber for combustion of the solids. A rotating combustion chamber member can be driven by the rotatable shaft and have solids removal members for removing the buildup of solids within portions of the combustion chamber. The heating chamber, evaporation arrangement, liquid delivery system and solids transfer system can be included in a thermal distiller. The distiller can further include a vapor compression distiller for providing a first distilling step positioned above the thermal distiller and having an influent reservoir for storing incoming liquid influent. The influent reservoir can be positioned above and can be heated by the evaporation arrangement of the thermal distiller through seven sequential stages from the heating chamber upwardly through the evaporation stages to the influent reservoir of the vapor compression distiller. The vapor compression distiller can provide the thermal distiller with concentrated liquid influent for further processing by the thermal distiller in a second distilling step.

The present invention can also provide a compound distiller for processing liquid influent including a first distiller for distilling the liquid influent in a first distilling step and producing first distillate and concentrated liquid influent. The first distiller can have a first reservoir for storing incoming liquid influent. A second distiller can be positioned below the first distiller for distilling the concentrated liquid influent received from the first distiller in a second distilling step. The second distiller can have a second reservoir for storing the concentrated liquid influent. A heating chamber can be positioned above the second reservoir. An evaporation arrangement can be positioned above and heated by the heating chamber for distilling the concentrated liquid influent and producing second distillate and solids, while heating the liquid influent stored in the first reservoir of the first distiller. A solids transfer system can move the solids produced by the evaporation arrangement to the heating chamber for combustion and providing heat.

The present invention can also provide a method of processing liquid influent in a distiller including providing a heating chamber. An evaporation arrangement can be positioned above the heating chamber and heated with the heating chamber. The evaporation arrangement can include spaced apart evaporation surfaces forming a bottom evaporation stage, multiple intermediate evaporation stages, and an upper evaporation stage. The bottom evaporation stage can be in thermal contact with the heating chamber, and the multiple intermediate and upper evaporation stages can be sequentially positioned above the bottom evaporation stage one above another. The liquid influent can be delivered with a liquid delivery system to the upper evaporation stage for initial evaporation, and at least a portion of the liquid influent in the upper evaporation stage and the intermediate evaporation stages can be transferred downwardly in sequence to a stage below until reaching the bottom evaporation stage for sequential evaporation at each evaporation stage. The bottom evaporation stage and intermediate evaporation stages can evaporate at least a portion of the liquid influent applied on the bottom and intermediate evaporation stages forming vapor, and heating the stage positioned above with the vapor. Solids can be moved on the evaporation surface of the bottom evaporation stage that remain from the evaporated liquid influent, to the heating chamber, where the solids can be combusted and provide heat.

In preferred embodiments, at least some of the evaporation stages can be each provided with lower condensing surfaces for condensing vapor, and upper evaporation surfaces heated by the vapor and for evaporating the liquid influent thereon. At least one of the liquid influent and solids on at least some of the upper evaporation surfaces can be wiped or scraped with wiping members for spreading or transfer. The vapor can be condensed into distillate for removal on the lower condensing surfaces which can include a spiral pattern that narrows moving radially outwardly. The solids can be delivered from the upper evaporation surface of the bottom evaporation stage to the heating chamber through a transfer port in the bottom evaporation stage. The liquid influent can be delivered to selected evaporation stages with a liquid delivery system that includes a series of pumps. The wiping members can be rotated and the pumps can be driven with a rotatable shaft extending through the evaporation arrangement. Initial heating of the heating chamber can be provided with a heating member or element. A combustion chamber can be provided for combustion of the solids. A rotating combustion chamber member having solids removal members can be driven with the rotatable shaft and remove buildup of solids within portions of the combustion chamber. The heating chamber, evaporation arrangement, liquid delivery system and solids transfer system can be included in a thermal distiller of the distiller. A first distilling step can be performed with a vapor compression distiller positioned above the thermal distiller. The vapor compression distiller can have an influent reservoir for storing incoming liquid influent. The influent reservoir can be positioned above and can be heated by the evaporation arrangement of the thermal distiller through seven sequential stages from the heating chamber upwardly through the evaporation stages to the influent reservoir of the vapor compression distiller for heating the liquid influent therein. The thermal distiller can be provided with concentrated liquid influent from the vapor compression distiller for further processing by the thermal distiller in a second distilling step.

The present invention can also provide a method of processing liquid influent including distilling the liquid influent with a first distiller in a first distilling step, and producing first distillate and concentrated liquid influent. The first distiller can have a first reservoir for storing incoming liquid influent. The concentrated liquid influent received from the first distiller can be distilled with a second distiller positioned below the first distiller in a second distilling step. The second distiller can have a second reservoir for storing the concentrated liquid influent. A heating chamber can be positioned above the second reservoir. An evaporation arrangement can be positioned above and heated by the heating chamber for distilling the concentrated liquid influent and produce second distillate and solids while heating the liquid influent stored in the first reservoir of the first distiller. The solids produced by the evaporation arrangement can be moved to the heating chamber for combustion by a solids transfer system and provide heat.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 13 is a top view of a condensing member with

FIG. 14 being a front view thereof with a top plate added in exploded manner, and FIG. 15 being a sectional view thereof taken along lines 15-15.

DETAILED DESCRIPTION OF THE INVENTION

A description of example embodiments of the invention follows.

Figure 1:
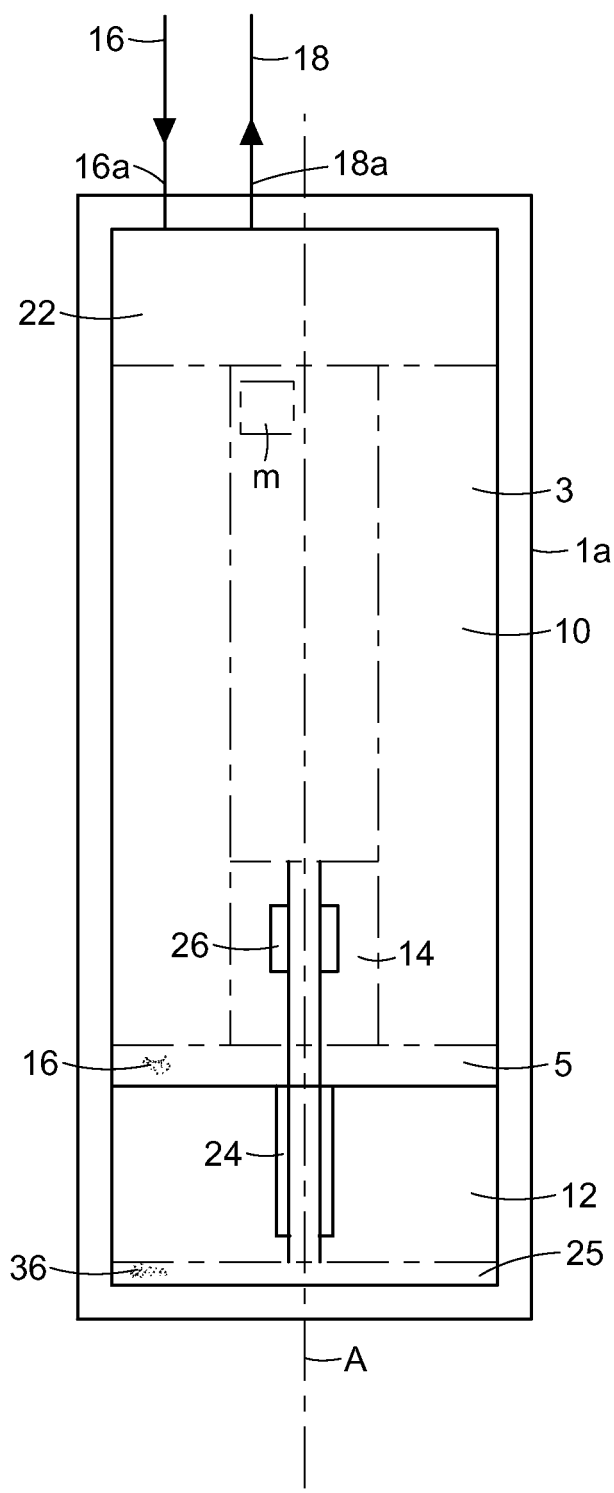
FIG. 1 is a schematic drawing of an embodiment of a distilling device or apparatus in the present invention.
Figure 2:
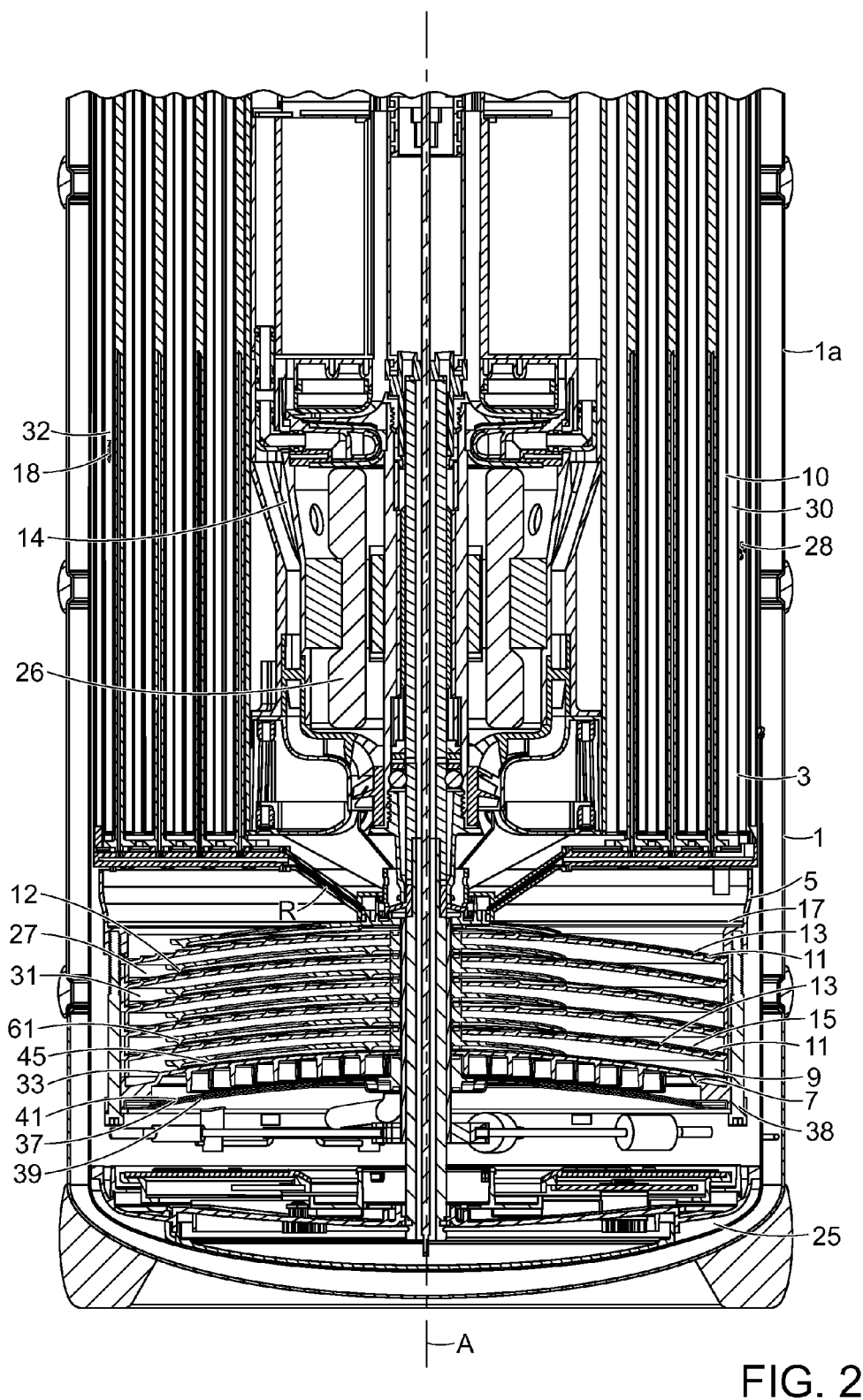
FIG. 2 is a side sectional view of a lower portion of an embodiment of a distilling device in the present invention.
Figure 3:
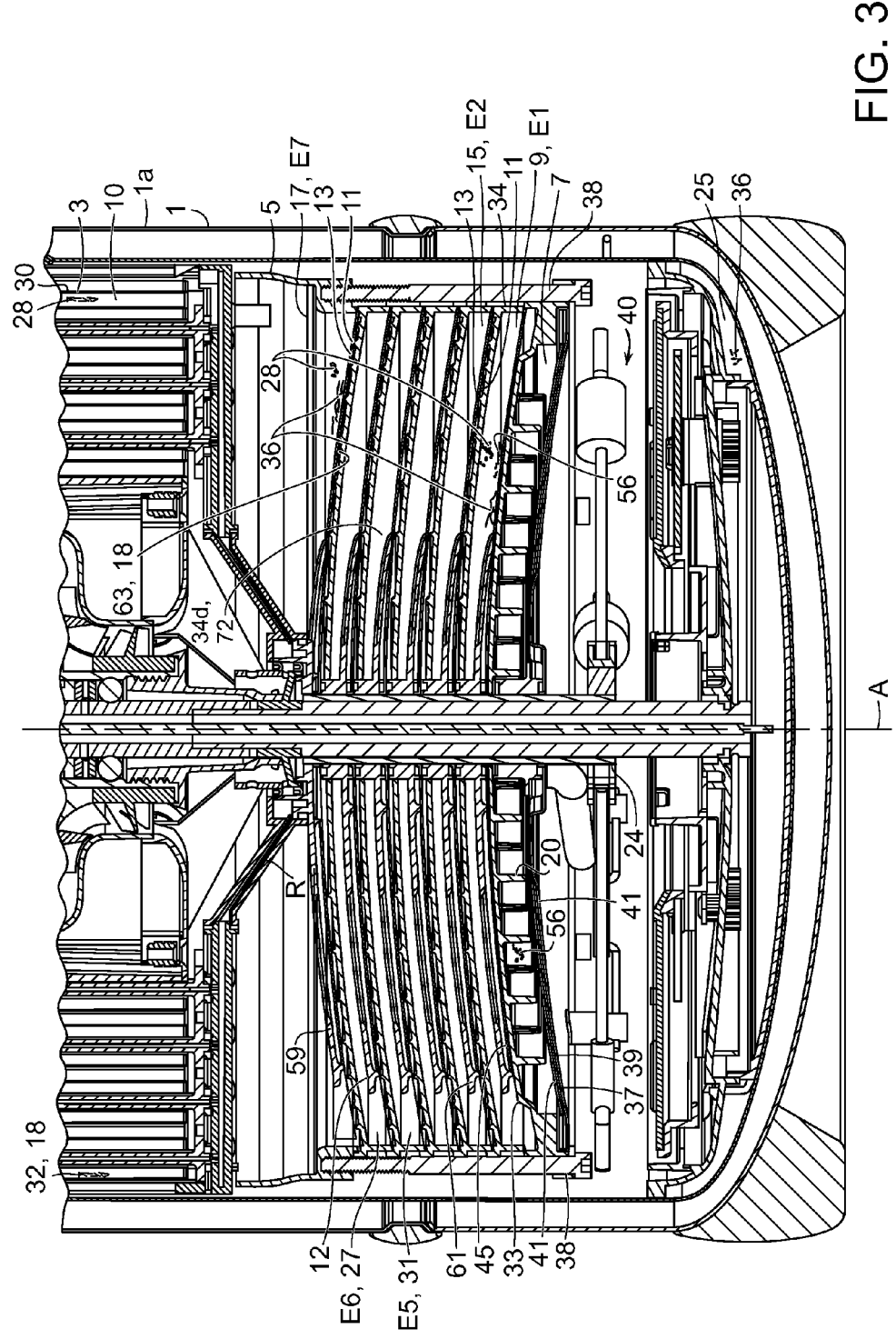
FIG. 3 is an enlargement of a portion thereof.

Referring to FIGS. 1-3, in embodiments of the present invention, compound distiller, distilling device or apparatus 1 can have a first distiller 10 which can be a vapor compression distiller, distilling device, apparatus, module or portion, positioned within an upper part of an insulated housing or dewar 1a, and can also have a second distiller 12, which can be a thermal distiller, distilling device, apparatus, module or portion, positioned within the lower part of the dewar 1a. The first distiller 10 can provide a first distilling or processing step, producing distillate 18 and concentrated liquid influent 36 (or effluent from distiller 10), and in some embodiments can be similar to that described in U.S. Pat. No. 8,858,758, issued Oct. 14, 2014, the contents of which are incorporated herein by reference in its entirety. The second distiller 12 can provide a second distilling or processing step to remove most or all of the liquid or water that remains in the concentrated liquid influent 36 from or after the first distilling step. The compound distiller 1 can have an inlet 16a for admitting incoming influent, water, liquid, fluid or wastewater 16, and an outlet 18a for discharging liquid or fluid distillate, condensate or treated water 18.

The first or vapor compression distiller 10 can include a counter flow heat exchanger 22, a first, upper or vapor compression sump or reservoir 5, a first evaporator/condenser 3, and a rotor 14 which is rotatably driven about a central longitudinal upright or vertical axis A by a motor 26. The incoming influent 16 can be preheated by outgoing heated distillate 18 in the counter flow heat exchanger 22, before reaching the first sump 5. The influent 16 within the sump 5 can be supplied to the first evaporator/condenser 3 which has a first evaporator 30 with first evaporation surfaces for boiling or evaporating some of the influent 16 into vapor, water vapor or steam 28. The vapor 28 is compressed by a compressor in the rotor 14 and delivered to a first condenser 32 of the first evaporator/condenser 3, which has first condensing surfaces for condensing the compressed vapor 28 into distillate or condensate 18, for removal or use through outlet 18a. The first evaporator/condenser 3 can include concentric cylindrical elements with the first evaporation surfaces and the first condensing surfaces being on opposite sides and sealed from each other. In other embodiments, the first evaporator/condenser 3 can include a series of tubes positioned adjacent to each other side by side in an annular arrangement. The influent 16 that remains or is left over from the first evaporator 30 can become concentrated into concentrated influent 36, and can flow back to the first sump 5 and/or to the second or thermal distiller 12 for further processing in a second process step to remove further water or liquid.

Figure 4:
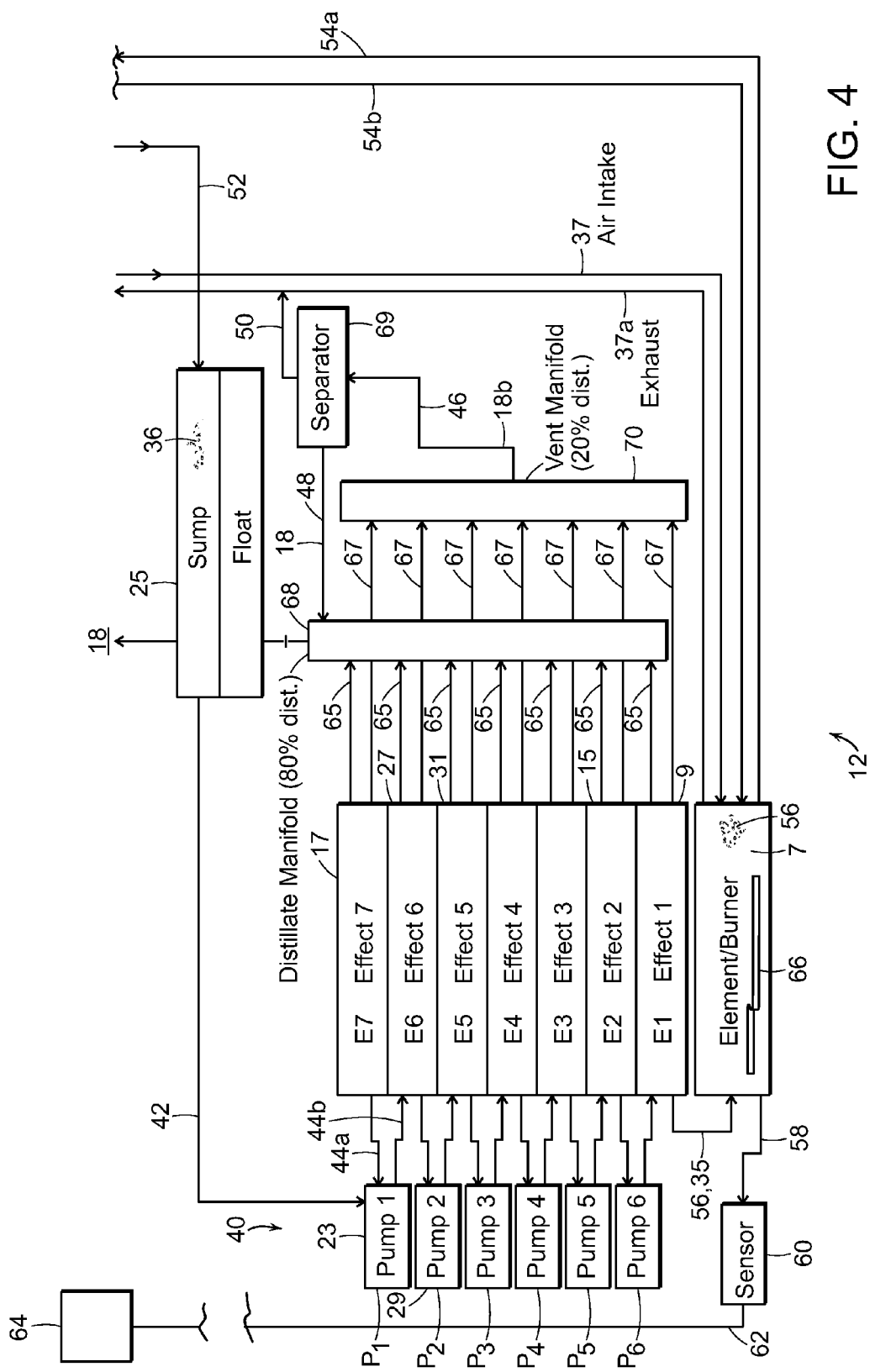
FIG. 4 is a schematic drawing of an embodiment of a compound distilling device, apparatus, module or portion, in or for a distilling device in the present invention.
Figure 5:
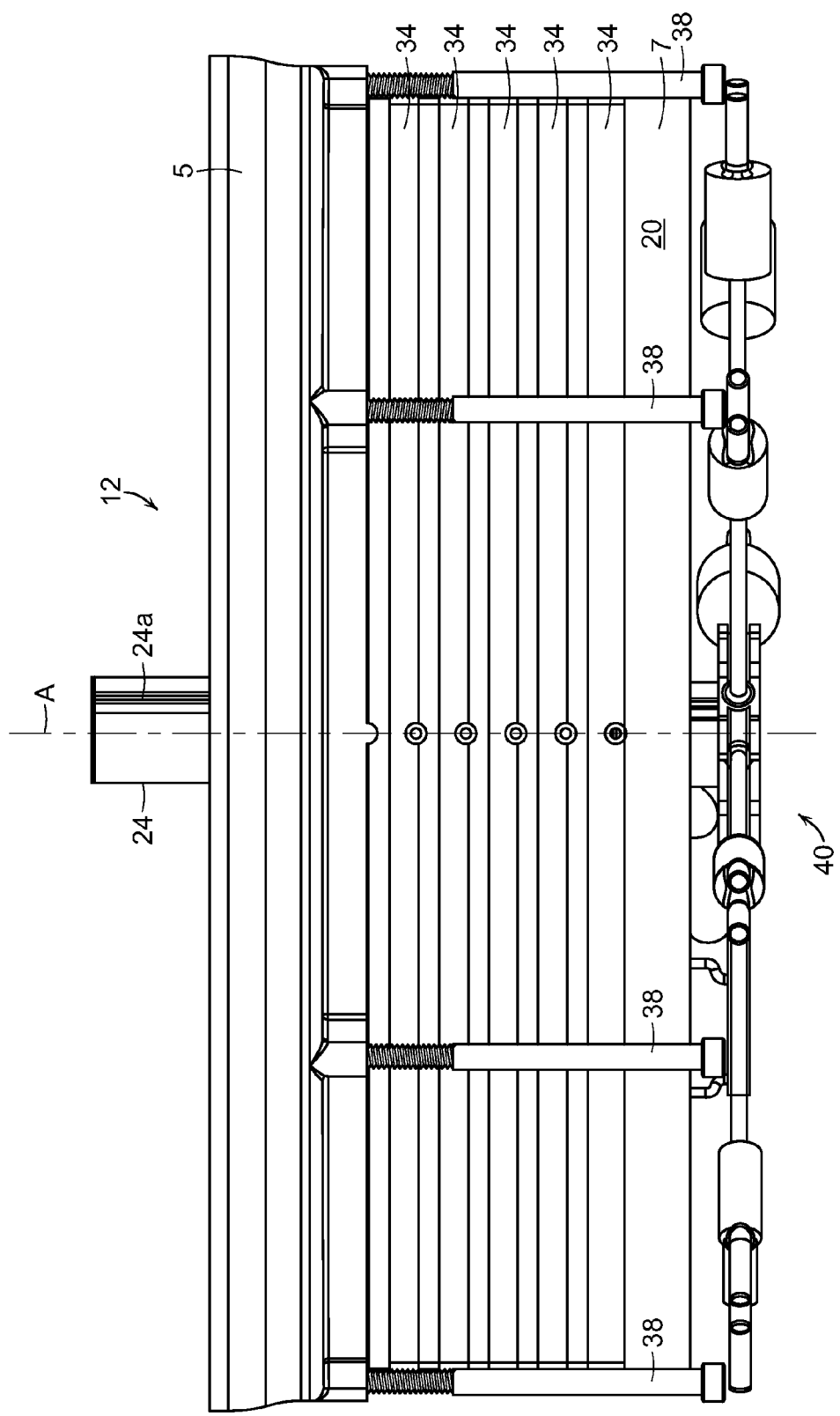
FIG. 5 is a front view of an embodiment of a compound distilling device, apparatus, module or portion in the present invention, or portion thereof.

The concentrated influent 36 can be delivered to the second or thermal distiller 12 and stored in a second, lower or thermal distiller sump or reservoir 25, entering via passage 52 (FIG. 4). Sump 25 can be located at the bottom of thermal distiller 12 or compound distiller 1 at the bottom of dewar 1a. The thermal distiller 12 or portions thereof can be positioned and secured under the sump 5 of the vapor compression distiller 10 in alignment thereof along central axis A (FIGS. 1-6), by a series of bolts 38. The bolts 38 can clamp or secure a lower combustion, furnace, burner or heating chamber, region, portion or device 7, which can include a lower rotating wall, member or baffle plate 41, an upper chamber, plate, structure or member 20 (FIGS. 7-12), and a lower housing wall 39, under or to a series of stacked evaporator/condenser elements, stages, members, plates, shields or dishes 34 that form an evaporator and condenser arrangement of a second evaporator/condenser, to the underside of sump 5 (FIGS. 2, 3 and 5), and sealed to each other. A shaft 24 can extend below rotor 14 downwardly through thermal distiller 12 and can be driven by a motor M positioned above and connected via arms R. Shaft 24 can rotate about a central shaft. The heating chamber 7 and evaporator/condenser elements 34 can be concentrically aligned or mounted about or around shaft 24 and axis A. An influent liquid delivery pump system, module, device, apparatus or arrangement 40 can be positioned below the heating chamber 7, and in some embodiments can include a series of influent pumps, for example six pumps P1-P6, for supplying concentrated influent 36 to and between a series of stages or effects which in some embodiments can include seven stages or effects, E7 to E1 (FIG. 4) of the thermal distiller 12. Heat can flow through the effects from the bottom up, while liquid flows from the top down. Pumps P1-P6 can be connected by inlets 44a and outlets 44b between effects as follows, P1 between effects E7 and E6, P2 between effects E6 and E5, P3 between effects E5 and E4, P4 between effects E4 and E3, P5 between effects E3 and E2, and P6 between effects E2 and E1. Each pump P1-P6 can be a positive displacement pump having check valves 47 and 49, and cylinders or pistons 51 as shown on pump 23 in FIG. 6. The pumps P1-P6 can be connected to the outer radial periphery of the associated effects and at least some of the pumps can pump influent 36 collecting at the outer downhill edges of top plates 11 to a lower effect below.

The sequential arrangement, stages or effects E1-E7 of the thermal distiller 12 can include a first evaporation stage or effect E1 or 9 on the upper surface of upper plate 45 of the heating chamber 7 for heating and drying or completely drying solids 56 of concentrated influent 36, and evaporating the liquid or water therein into steam, vapor or water vapor 28, to heat the second effect E2 or 15 directly above E1, which operates as an evaporator/condenser stage. Effect E2 or 15 can include lower condensing surfaces which can include spiral channels or chamber 63 for condensing vapor 28 from the first effect E1. The lower condensing surfaces 63 can be sealed and covered by a top plate 11 having a top or upper surface 13 that form evaporating surfaces, which is heated by the vapor 28 on the lower condensing surfaces 63 for heating and evaporating water or liquid from concentrated influent 36 applied on the top plate 11. Evaporator/condenser effects or stages E2 through E6 can have identical construction including lower condensing surfaces with spiral channels 63 and a top plate 11 with upper surfaces 13, and can be sequentially arranged. Effects E2-E5 can be intermediate evaporator/condenser effects or stages, and effect E6 can be an upper evaporator/condenser effect or stage, each being heated on lower condensing surfaces 63 by vapor 28 from an effect below it, and evaporating liquid water on the upper evaporating surfaces 13 into vapor 28, with the temperature and pressure between each effect decreasing moving upwardly until reaching the seventh affect E7 or 17, which can be the bottom of the sump 5 for the first or vapor compression distiller 10. This incremental sequential transfer of heat by the vapor 28 can heat and increase the temperature of the liquid influent 16 in sump 5 above the temperature that it is heated by the counter flow heat exchanger 22, so that the influent 16 from sump 5 when applied to the first evaporator/condenser 3 can more easily or quickly evaporate into vapor 28.

As the heat from heating chamber 7 is transferred upwardly from effects E1 to E7, the concentrated influent 36 from sump 25 is applied to the upper evaporator/condenser effect, such as the sixth effect 27 or E6, from sump 25 via conduit or passage 42, and pump P1 or 23, for initial evaporation of at least a portion of the liquid or water in the concentrated influent 36 on the upper evaporating surfaces 13 into vapor 28 which heats the sump 5 or seventh effect E7 above. Pump P1 can have an inlet or passage 44a for receiving liquid if any from effect E7, such as condensed vapor 28, and an outlet or passage 44b connected to effect E6 to deliver concentrated influent 36 thereto. Each pump P1 through P6 can have an inlet 44a and outlet 44b. A rotary wiper or scraper 59 can spread the concentrated influent 36 into a thin film such as 2-3 mils (0.002-0.003 inches) thick for evaporation, radially outwardly and downhill. The remaining concentrated influent 36 not evaporated on upper surface of effect E6 now with higher concentration of solids 56 can be wiped by a rotary wiper or scraper 59, which can push, wipe, scrape or direct the un-evaporated concentrated influent 36 radially outwardly and downhill to the next pump P2 via inlet 44a for delivery to the fifth effect 31 or E5 via outlet 44b. Effect E5 is lower or closer to the heating chamber 7, and has a higher temperature and pressure.

The same or similar step occurs at effect E5 of spreading a thin film of concentrated influent 36 with a wiper 59 on the upper surfaces 13, evaporation of at least a portion of the liquid water in the concentrated influent 36 thereon, and scraping the un-evaporated concentrated influent 36 having a higher concentration of solids 56 with the wiper 59 to the next pump P3 via inlet 44a. The vapor 28 that evaporated from effect E5 condenses on the lower condensing surfaces of effect E6 within spiral channel 63 into distillate 18 and exits via port, passage or conduit 65 to a distillate or condensate manifold 68 for removal from the compound distiller 1 through outlet 18a. Distillate with dissolved gases 18b can exit via port passage or conduit 67 that is downstream of port 65 to another manifold 70. The distillate with dissolved gases 18b can travel via passage 46 to a separator 69 for removing the gases which can be vented out passage 50 and exhaust passage 37a. Distillate 18 separated in separator 69 can travel via passage 48 to manifold 68 for removal. The leftover unevaporated concentrated influent 36 with now a higher concentration of solids 56 is directed to the next effect E4 and the same steps or process repeats itself continuing to effects E3 and E2. The evaporator/condenser effects E5, E4, E3, and E2 typically operate in a similar fashion as described for effect E5 or E6. Each intermediate effect E5-E2 is heated by vapor 28 from a lower effect and condenses the vapor 28 into distillate 18 for removal, while incrementally evaporating concentrated influent 36 thereon at incrementally increasing stage temperatures for further increasing the amount of solids 56 thereon before pumping to a lower, hotter and higher pressure effect. Each pump P1-P6 pumps against a higher pressure until reaching in some embodiments about 25 PSIG at the first effect E1, which is the highest temperature effect for drying solids 56 from concentrated influent 36 on plate 45 at the first effect E1 or 9, by removing all or most of the moisture to form a powder or granules.

A scraper or wiper 59 can rotatably scrape dried solids or powder 56 at effect E1 from plate 45 near the outer diameter 33, and direct the solids 56 radially outwardly to the outer downhill periphery of plate 45 to a transfer grate, port or opening 35 to the heating chamber 7 for combustion therein for further providing heating chamber 7 with additional heat for drying the concentrated influent 36 on plate 45, while reducing the operating costs of heating chamber 7. The additional heat can provide faster or more effective drying, and/or reduce the cost or energy expenditure of drying. The solids 56 initially conveyed to the heating chamber 7 can be ignited by a heating, igniting or combustion element or member 66 within the heating chamber 7, and additional delivered solids 56 can be ignited by existing burning solids 56. The heating element 66 can be an electrical heating element such as a resistance element, and can be used to operate heating chamber 7 until sufficient solids 56 are produced that are burned, and then can be turned down or off. Air or oxygen for combustion can be provided to the heating chamber 7 by a connected air intake passage 37, and exhaust gases with ash can exit via connected exhaust passage 37a. Operation of the heating chamber 7 and element 66 can be controlled by a controller 64 via electrical or control lines 54a and 54b, and a sensor 60 can be connected to heating chamber 7 and controller 64 via lines 58 and 62. Sensor 60 can be or include a temperature sensor, a gas sensor, and/or pressure sensor. The pressure within heating chamber 7 during operation in some embodiments can be about 0.2 PSIG.

In general, heat originating in heating chamber 7 at effect E1 heats multiple stages E2-E7 that are sequentially mounted upwardly above heating chamber 7. Each higher stage or effect E2-E7 is at a lower temperature than the effect directly below, until heating the sump 5 of the vapor compression distiller 10. This can allow less energy to be used for compressing vapor 28 in the vapor compression distiller 10 for a given volume of distillate 18 produced from influent 16. At the same time, concentrated influent 36 moves sequentially downwardly from the effects E6 to E1, each lower stage having a higher temperature and evaporating more liquid from the concentrated influent 36. For example, about ⅙ of the liquid can be removed at each stage or effect, for reducing the amount of liquid and increasing the concentration of solids 56 in each progressive lower effect until completely drying at effect E1. By completely drying the concentrated influent 36, most or all of the liquid that is left over from the vapor compression's distiller 10 in the first process step can be recovered or processed in the second process step by the thermal distiller 12. Having increasing temperature stages moving downwardly for processing concentrated influent 36 which increases the concentration of solids 56 while moving downwardly through the stages or effects, compensates for or overcomes the rising or increasing boiling temperature of the increasing concentration of solids 56. The transfer grate 35 can be small and close-fitting so that gas or pressure leakage between heating chamber 7 and the first effect E1 are minimal.

Referring to FIGS. 1-3, 5 and 6, motor M can rotate shaft 24 about axis A extending through the center of thermal distiller 12. A series of wipers or scrapers 59, for example six, can be rotatably mounted to the shaft 24 for rotatably spreading, wiping or scraping the top surfaces of plates 45 and 11 of respective effects E1-E6 simultaneously in unison progressively radially outwardly and downhill. Each wiper 59 (FIGS. 16-18) can have a hole or bore 59b for fitting onto the diameter shaft 24. Rotational locking members 59d can extend radially inward in bore 59b for engaging corresponding structures 24a on the shaft 24, such as flats, holes, keyways or splines, for rotational locking thereto. The locking members 59d can be protrusions, locking screws, pins or keys, etc., and can include one or two members 59d per wiper 59. The shaft 24 and wipers 59 can rotate in some embodiments at about 40 revolutions per minute, but other rotational speeds can be used. Wiping of the concentrated liquid influent 36 and scraping of solids 56 by wipers 59, as well as evaporation of at least a portion of the influent 36, can continuously occur in time with the rotational speed of the shaft 24.

Figure 6:
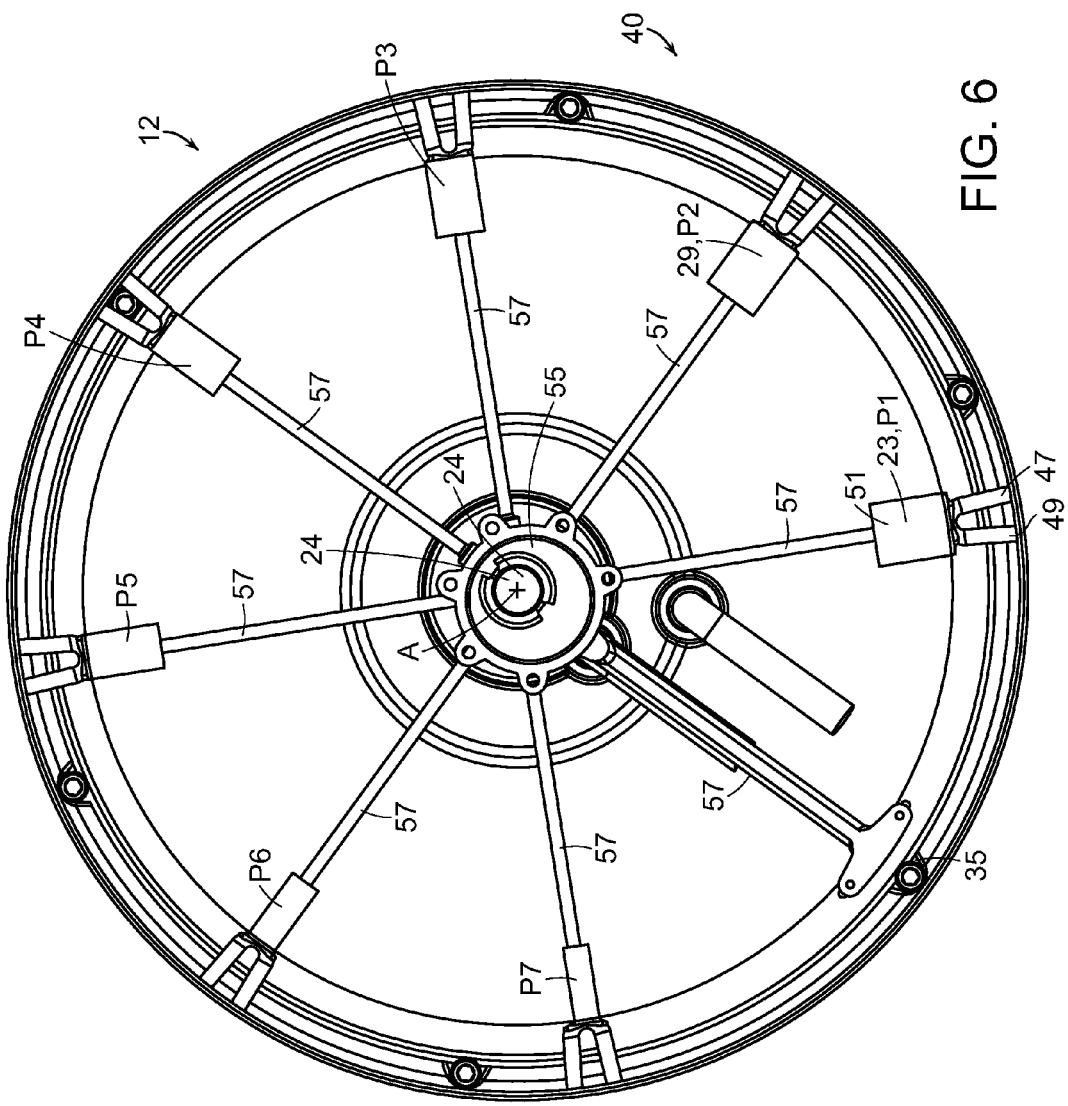
FIG. 6 is a bottom view thereof.

The shaft 24 can also operate the pump system 40. Pump system 40 including pumps P1-P6, can be secured relative to or to, below the bottom of heating chamber 7, and can be clamped by bolts 38. Referring to FIG. 6, shaft 24 can rotate a cam 55, such as an eccentric or round diameter member. A series of reciprocating connecting rods 57 can extend radially outward relative to axis A to respective connected or associated radially outwardly positioned piston pumps P1-P6. The connecting rods 57 can sequentially actuate the pistons or cylinders 51 of pumps P1-P6 by engagement with the rotating cam 55, for applying the concentrated influent 36 at effects E6-E1. An additional pump P7 and connecting rod 57 can be included if desired, to provide pumping in another desired location as needed. The transfer grate 35 can have an opening and closing mechanism, port or door which can be also operated by reciprocating connecting rod 57 and rotating cam 55, to open when solids 56 are delivered to the heating chamber 7, and then close for sealing. Using motor M to operate scrapers 59, pumps P1-P6 or P7 and transfer grate 35, allow these components to continuously operate together in a desired sequence or manner with rotation of shaft 24, and can allow operation of thermal distiller 12 in an energy-efficient manner. The motor M can also operate some components in vapor compression distiller 10. In some embodiments, transfer of influent 36 and solids 56 can occur once per revolution. In other embodiments, pumps P1-P6 and P7 can be electrically operated. The pumps P1-P6 can have incrementally decreasing cylinder diameters moving from P1 to pump P6. The pump fluid amount requirements can decrease moving from effect E6 to effect E1 and moving from corresponding pumps P1 to pump P6, while the pressure requirements increase, due to the increasing pressures as well as concentration of solids 56. The incrementally decreasing cylinder diameters moving from pump P1 to pump P6 can incrementally decrease pumping volume while incrementally increasing pressure.

Figure 7:
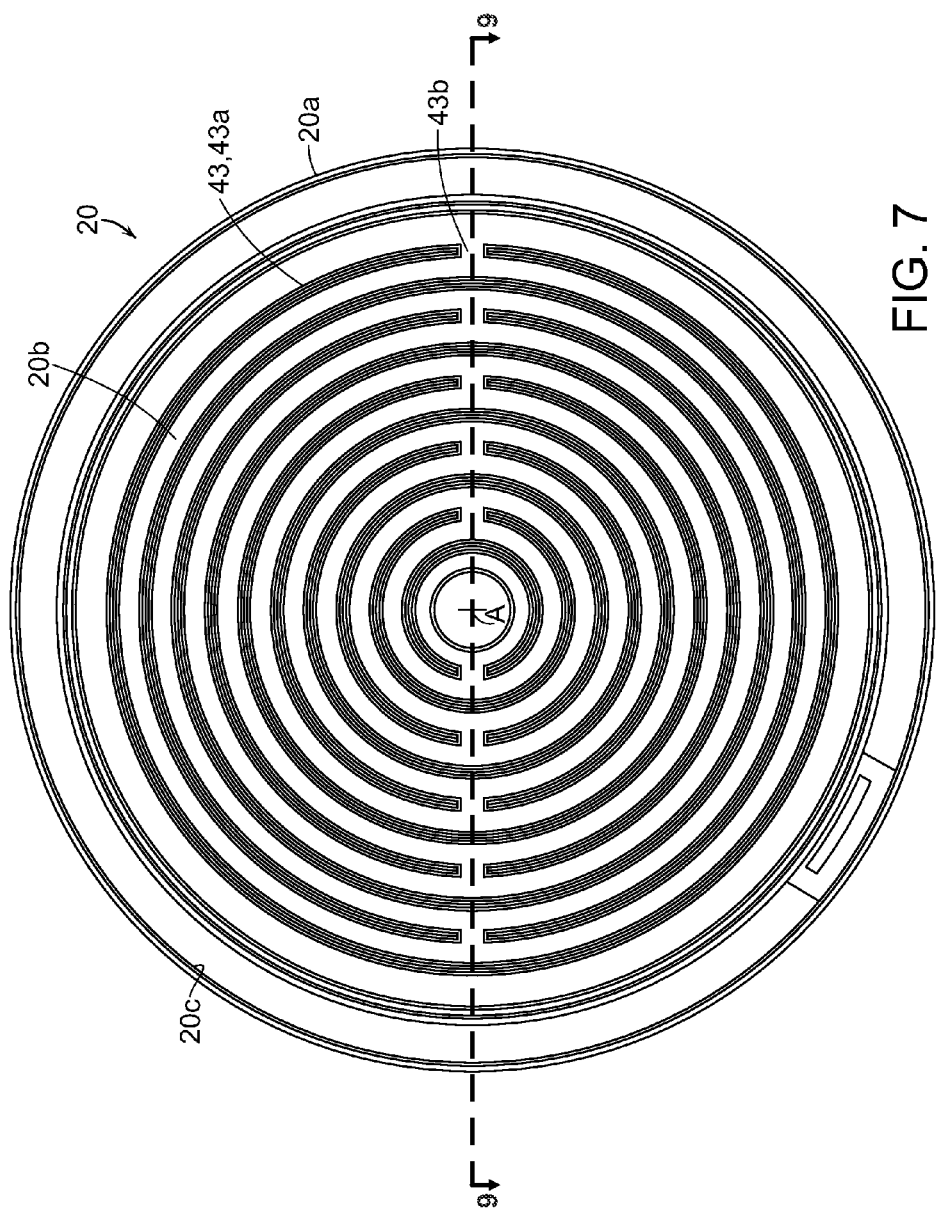
FIG. 7 is a bottom view of an embodiment of an upper heating, burner or combustion chamber member in the present invention, with FIG. 8 being a front view thereof, and FIG. 9 being a sectional view thereof taken along lines 9-9.
Figure 10:
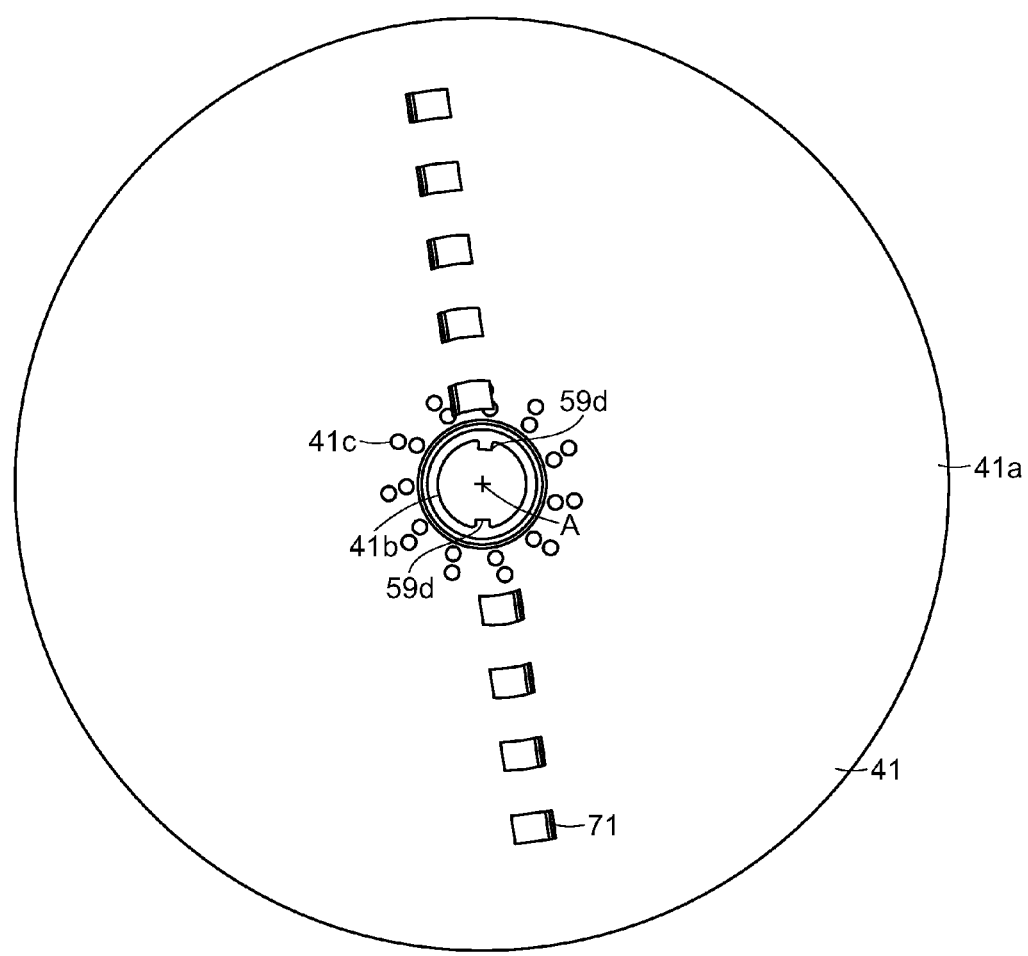
FIG. 10 is a top view of an embodiment of a lower heating, burner or combustion chamber plate or member in the present invention, with FIG. 11 being a front view thereof, and FIG. 12 being a bottom view thereof.
Figure 11:
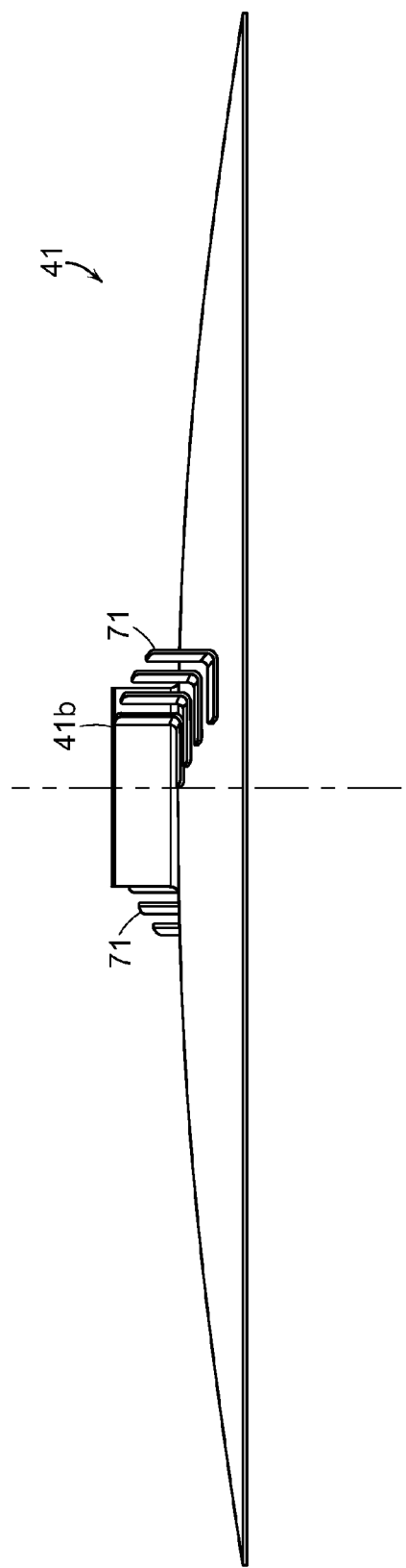
Figure 12:
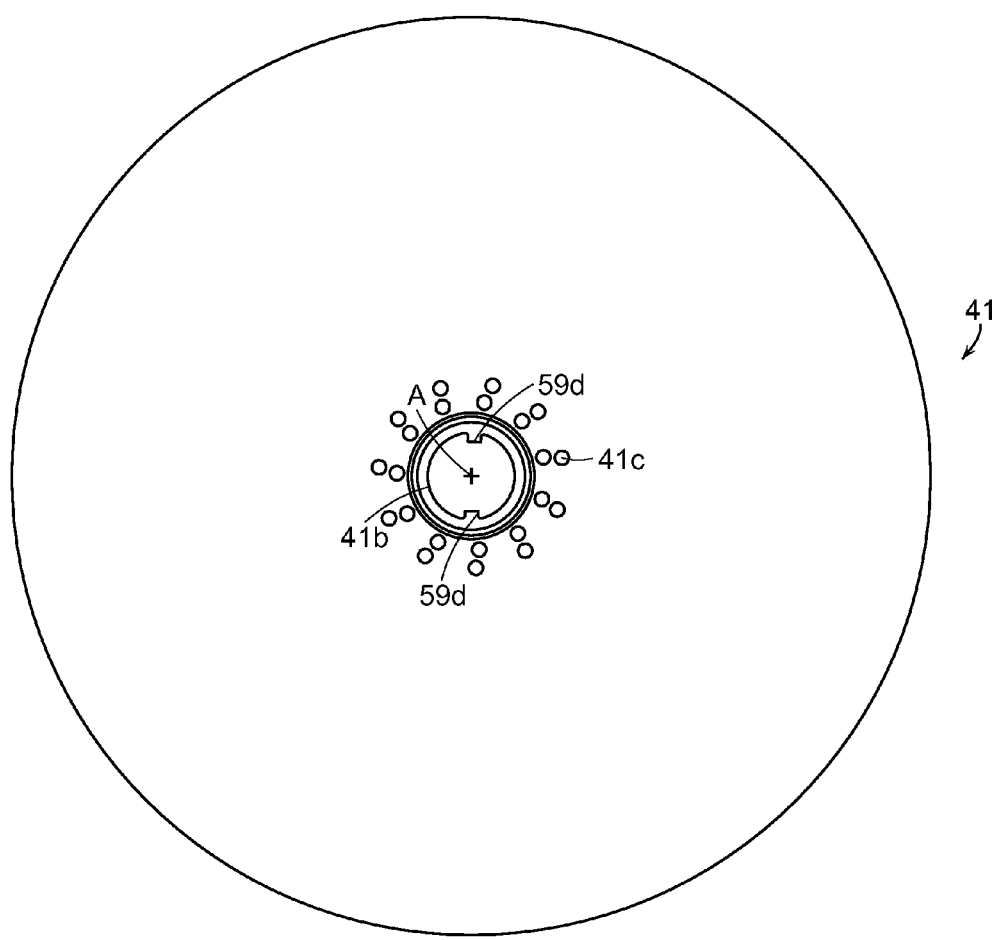

Referring to FIGS. 7-9, the upper chamber structure member 20 of the heating chamber 7 can have a generally round outer sidewall 20a, and an upwardly bulging curved or convex upper surface or plate 45. The curved upper plate 45 can allow concentrated influent 36 to be spread radially outwardly and downwardly or down hill by wiper 59 for drying and accumulating solids 56 at the outer diameter 33 of the upper curved plate 45 for transfer via grate 35 into the heating chamber 7 for combustion. The underside of plate 45 in the interior 20b of member 20 can have a labyrinth 43 that can include a series of concentric circular baffles 43a with openings 43b through opposite sides of the adjacent baffles 43a. The rotating baffle plate 41 (FIGS. 10-12) can be rotatably mounted to shaft 24. about axis A for rotation by a central bore 41b and rotational locking members 59d. The plate 41 can be generally round and include an upwardly bulging curved or convex upper surface 41a for positioning and rotating close to the bottom of the upper chamber member 20 above a lower housing wall 39 (FIG. 3), which is secured within or against an internal shoulder diameter 20c at the outer diameter of plate 41. The plate 41 also curves to be close to the bottom of baffles 43a, thereby forming the heating chamber 7 between plates 41 and 45. The plate 41 can include holes 41c for allowing air from passage 37 to enter the heating chamber 7. The top surface of plate 41 can also include a series of radially spaced apart upright partitions 71 which rotatably move with rotation of plate 41 through the annular concentric spaces or passages between baffles 43a of the upper chamber member 20 to stir, scrape or remove any combustion residue or solids 56 accumulating in the passages. Combustion of the solids 56 can take place on the top surface of the plate 41 as it rotates, and the solids 56 can be driven by the partitions 71 through the labyrinth 43 from the outside diameter to the inside where heat of combustion and/or heat of element 66 can be delivered to plate 45 of the first effect E1. Stirring the solids 56 can aid or increase the combustion, which can result in more efficient or complete combustion.

Figure 13:
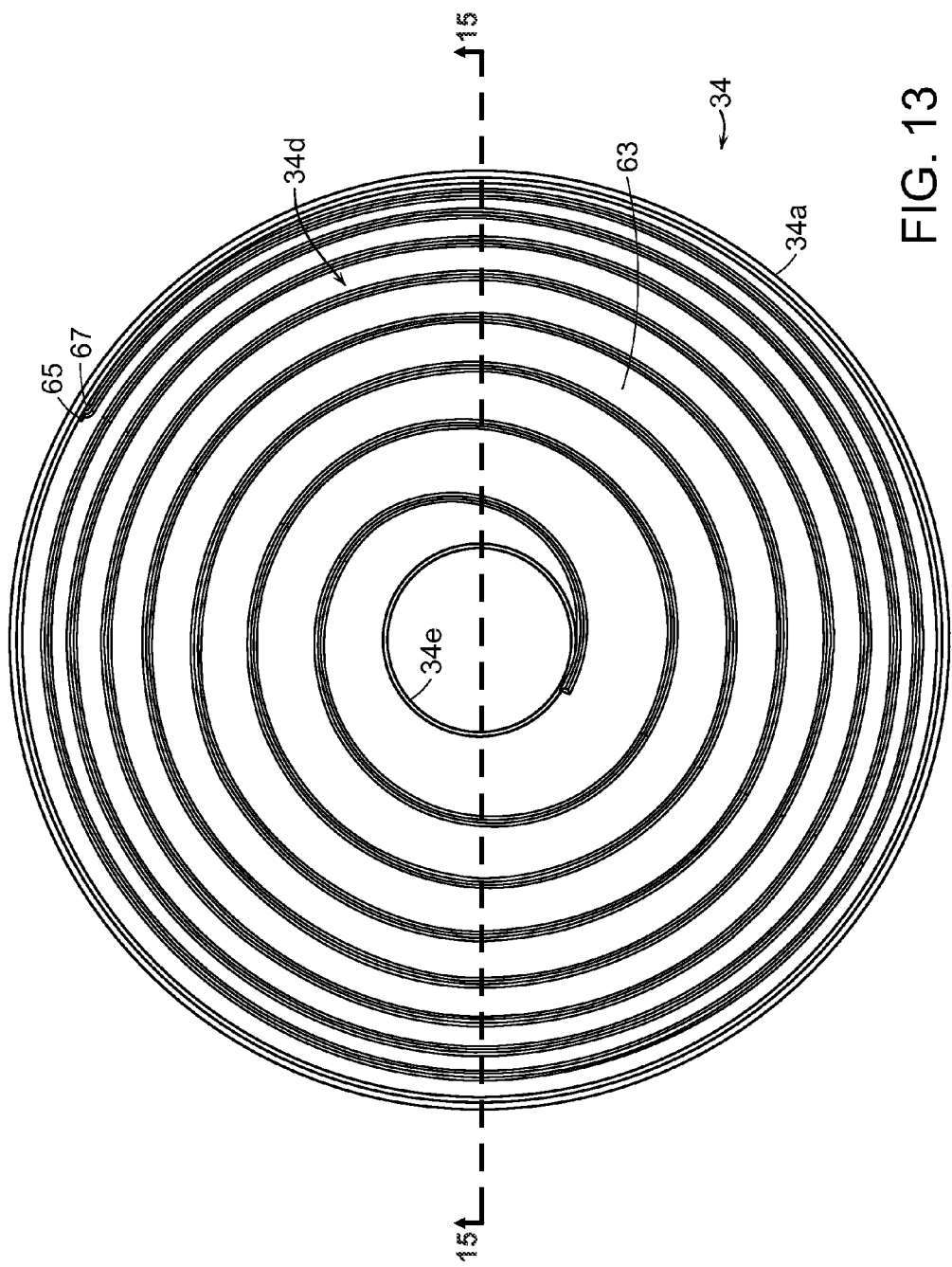

Referring to FIGS. 13-15, the evaporator/condenser stages or members 34 can be assembled together to form sequential stages or effects E2-E6, where the intermediate evaporator/condenser stages E2-E5, and the upper evaporator/condenser stage E6, can have a top plate 11 positioned over the top of each member 34 and sealed over the spiral condensing channels 63. Each evaporator/condenser member 34 can have round or circular lower outer sidewall 34a, and an upwardly bulging curved or convex upper surface or plate 34c with the spiral channels 63 formed on the top surface. When the top plate 11 is fitted and sealed over the spiral channels 63, spiral channels 63 are sealed below top plate 11 and are in communication with the interior 34d of the evaporator/condenser member 34 via central hole or opening 34e at the apex of the convex plate 34c. The upper surface 13 of the top plate 11 forms the upper evaporation surfaces that are heated by the condensing vapor 28 below in channels 63.

A series of evaporator/condenser members 34, for example five, can be stacked together, one above or on top of each other and sealed to each other and between upper chamber member 20 of heating chamber 7 and sump 5, forming a series of upwardly arched or curved annular gaps 72 therebetween (FIG. 3). The bottom of the outer sidewall 34a of the member 34 can be seated and sealed to the upper inner shoulder diameter 20d of upper chamber member 20, and the remaining members 34 can seat and seal the bottom of the outer sidewall 34a in the upper inner shoulder diameters 34b of a member 34 below. As a result, vapor 28 evaporated from concentrated influent 36 at the bottom of a gap 72 can rise upwardly within gap 72 moving toward the center through ports in baffles 61 and into opening 34e at the top center and entering the spiral condensing channels 63 for condensing into distillate 18. Heated vapor 28 rising in each gap 72 heats the spaced apart plates 11 forming the evaporation surfaces. The spiral channels 63 spiral outwardly while tapering, narrowing or decreasing in width for condensing vapor 28 as it spirals radially outwardly. As condensation takes place, the volume of vapor 28 is progressively less and a reasonable velocity can be maintained by the tapered spiral 63 to drive condensation along the spiral 63 toward the outside port 65 on the second to last turn, for removing about 80% of the distillate 18, and at a port 67 at the end of the spiral 63 for removing the remaining 20% of the distillate 18 which also has dissolved non-condensable gases. Capillary tubes can regulate flow from connected ports 65 and 67. The non-condensable gases can be separated from the distillate 18 in separator 69. The spiral 63 below the top plate 11 forms lower condensing surfaces which heats the top plate 11 that forms the upper evaporation surfaces for each evaporator/condenser stage 34. In some embodiments, the top plate 11 can be about 15 mils (0.015 inches) thick stainless steel. Each evaporator/condenser member 34 can have an upper semicircular recess 76a in the upper rim 74 extending into the upper inner shoulder diameter 34b and a lower port or opening 76b in the lower outer sidewall 34a. When two evaporator/condenser members 34 are stacked together, the lower port 76b of one member 34 can align with the upper recess 76a of the other member 34 to combine to provide a port in communication with spiral channel 63, for removing distillate 18, such as port 65 and/or port 67. The ports can also be used to connect to the pumps in some embodiments.

Figure 16:
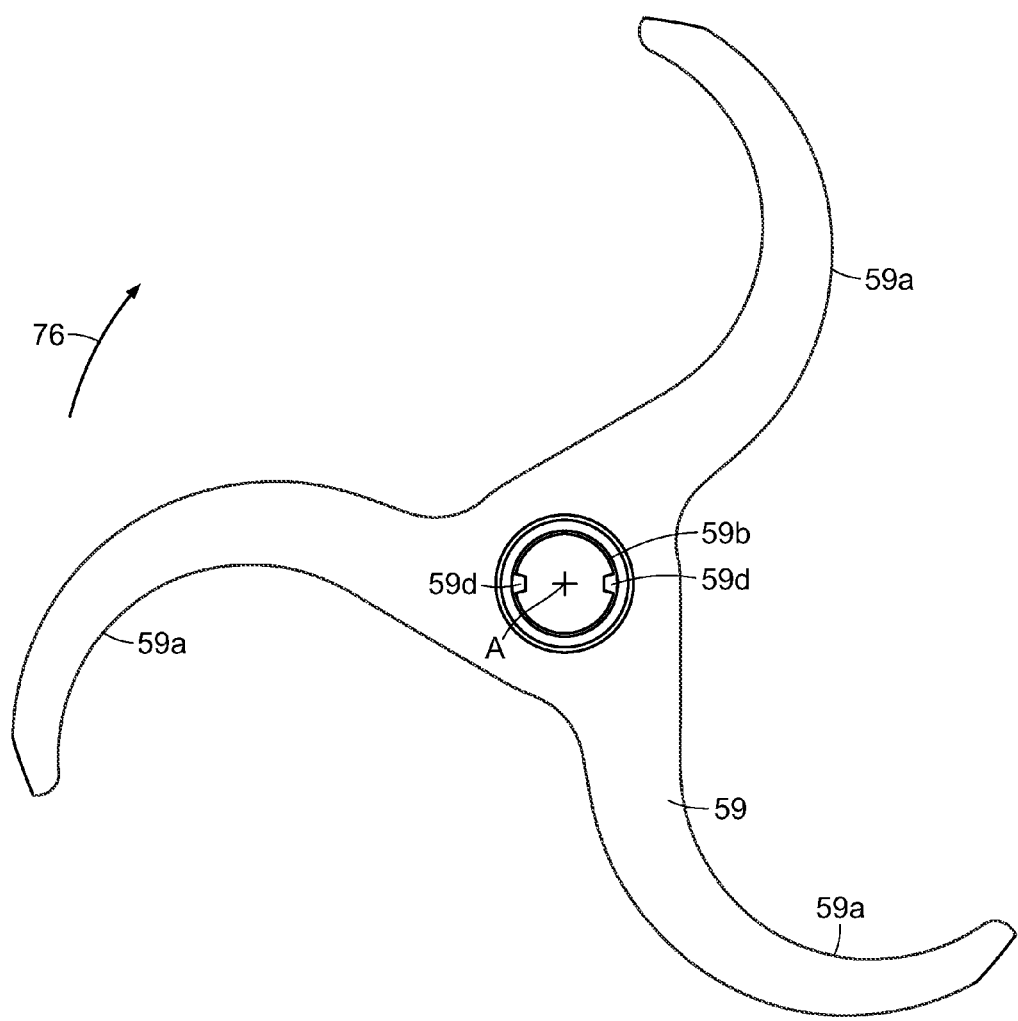
FIG. 16 is a top view of an embodiment of a scraping, wiping or spreading member in the present invention, with FIG. 17 being a bottom view thereof, and FIG. 18 being a front view thereof.
Figure 17:
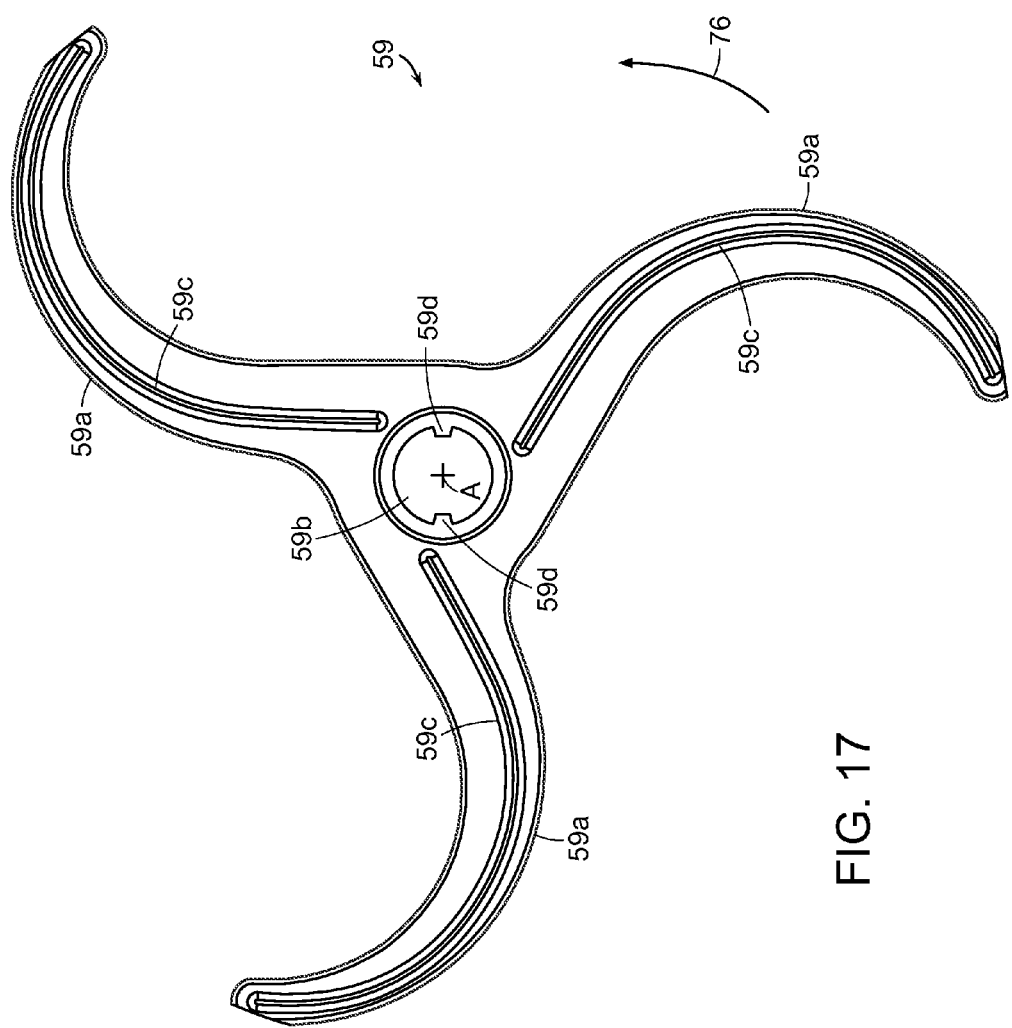
Figure 18:
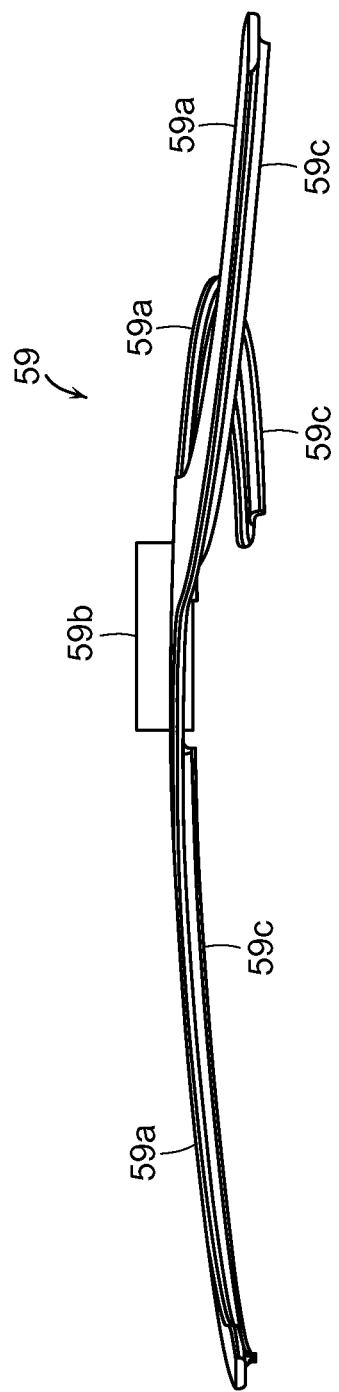

Referring to FIGS. 16 through 18, wiper or scraper 59 can have three spiral arms 59a (FIGS. 16 and 17) which extend radially outwardly relative to axis A and then curve in the rearward direction (relative to rotational movement shown by arrow 76). Each arm 59a can include a wiper, scraper and/or spreading member or blade 59c for spreading, wiping or scraping concentrated influent 36 and/or solids 56 at effects E1-E6 progressively radially outwardly and downwardly or downhill over the curved plates 45 and 11, and to the periphery. The blades 59c can curve in a similar manner as the arms 59a. In addition, each arm 59a and blade 59c can have an upwardly curved, bulging or convex shape (FIG. 18) to match the convex shapes of plates 45 and 11 at effects E1-E6.

Figure 19:
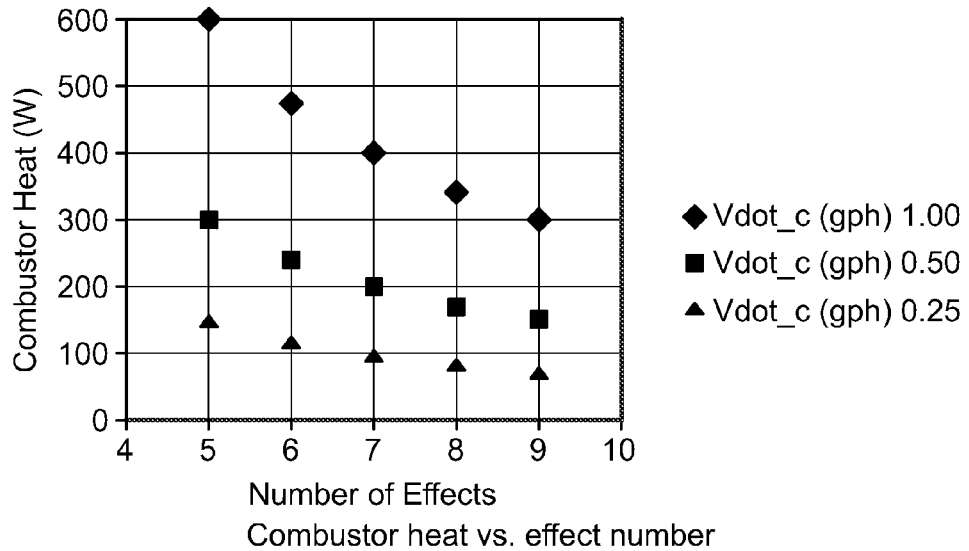
FIG. 19 is a graph depicting combustor heat versus effect number.

FIG. 19 shows combustor heat (burner power input) as a function of the number of effects for three different concentration flows, 1 gallon per hour, 0.5 gallons per hour, and 0.25 gallons per hour. With a fixed distiller influent mass fraction, the mass fraction to the burner changes with concentrate (1.00, 0.50, and 0.25 gallons per hour corresponds to 20, 40 and 80 ppt). The combustor heat decreases as the number of effects increase because the heat per effect decreases. The combustor heat increases with distiller concentrate flow because the total evaporation heat increases. At 7 effects and 0.50 gallons per hour, the combustor heat can be roughly 200 W.

Figure 20:
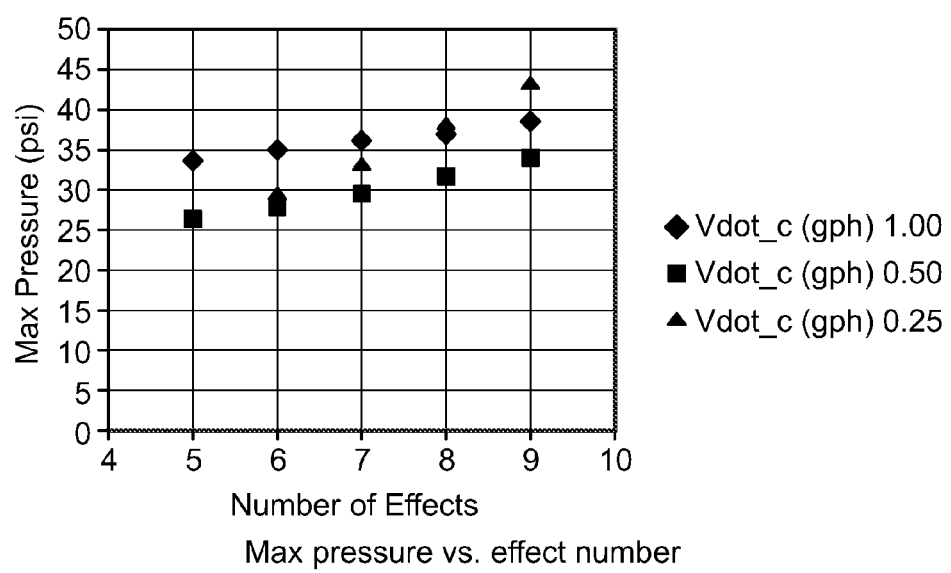
FIG. 20 is a graph depicting maximum pressure versus effect number.
Figure 21:
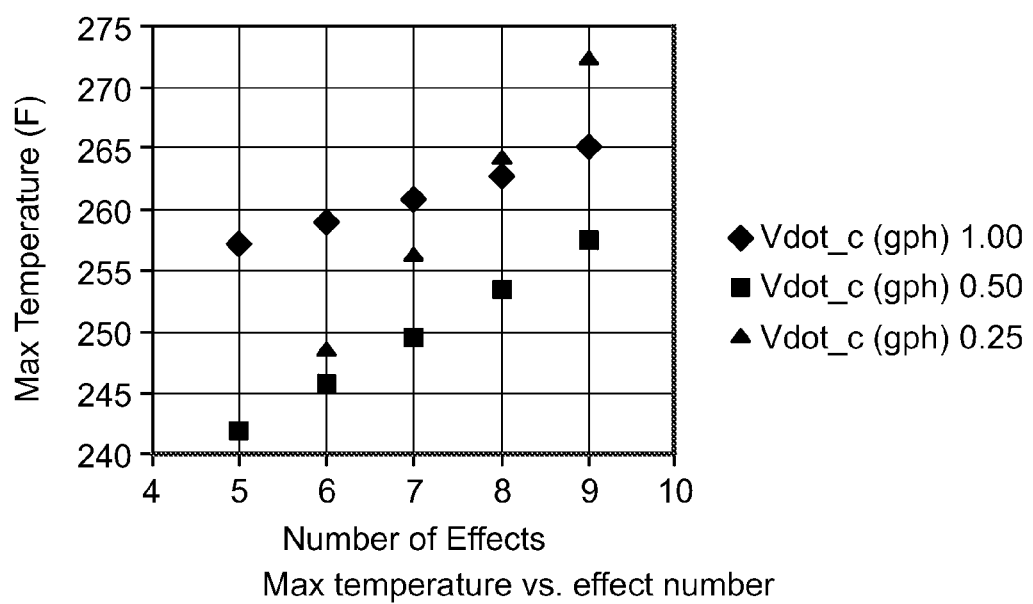
FIG. 21 is a graph depicting the maximum temperature versus effect number.

FIGS. 20 and 21 show the maximum pressure ($P_1$) and temperature ($T_{evap,1}$) as a function of the number of effects with sensitivity to flow rate. The maxed pressure increases with the number stages and the flow rate. As the number of effects increase, the stack up of temperature differences leads to a corresponding stack up of saturation pressure differences. An increase in flow rate leads to an increase in required heat, which requires larger temperature differences per stage, which increases the temperature stack up. As the flow is decreased, the max pressure and temperature becomes increasingly sensitive to the number of stages. For instance, at 7 effects, the 0.50 flow case has the lowest max pressure and temperature. This is the result of boiling point rise effects being felt farther up the number of effects, which drives up the temperature stack-up.

In embodiments of the invention, the vapor compression distiller 10 can remove most of the liquid water from liquid influent 16, and the thermal distiller 12 can remove most or all of the remaining water, followed by the combustion of the solids 56 at high temperature to enable discharge of a clean powder from the contaminants. The process is efficient because most of the water is removed at a very low energy expenditure, and the vapor compression distiller 10 can run at a lower energy consumption rate than if it were operated alone. This can result in the production of distilled water at 20 watt hours per gallon on typical wastewater, while eliminating the production and disposal of concentrated waste liquid. A vapor compression distiller 10 by itself can produce 20 gallons per hour of distillate 18 using about 400 W, while producing about 0.5 gallons per hour of concentrated waste liquid. The thermal distiller 12 can process the remaining 5 gallons per hour and is capable in some embodiments of producing 20 gallons per hour of distillate 18 and a dry ash. In some embodiments, the vapor compression distiller 10 and the thermal distiller 12, together can still produce 20 gallons per hour of distillate at 400 W, while at the same time processing the concentrated influent 36 so that there is no concentrated waste liquid to be disposed of Concentrate overflow from the vapor compression distiller 10 can supply the thermal distiller 12, and flow to the sump 25. The level of sump 25 can be used to regulate influent valve for the compound distiller 1. The thermal distiller 12 in some embodiments can be about 8 inches in diameter, 5 inches high and weigh about 5 pounds. Metal such as stainless steel, aluminum and copper, or alloys thereof, can be used for some of the components which can include the evaporator and condenser surfaces or parts thereof. Other parts can be formed of plastic. In some embodiments, at 7 stages and 0.5 gallons per hour, power input from the multiple effect burner can be about 200 W and maximum pressure can be about 30 PSI (absolute).

While this invention has been particularly shown and described with references to example embodiments thereof, it will be understood by those skilled in the art that various changes in form and details may be made therein without departing from the scope of the invention encompassed by the appended claims.

For example, although the first distiller 10 has been described as a vapor compression distiller, in some embodiments, other types of distillers can be employed as the first distiller. In addition, in some embodiments, the second distiller 12 can be positioned in a different location in the housing relative to the first distiller 10 than shown, or can be in a separate housing. Furthermore, liquids or fluids other than water can be processed. In some embodiments, the top plate 11 of an upper effect can heat the bottom of sump 5 of the vapor compression distiller 10. In some embodiments, more than 7 effects, or less than 7 effects can be employed.

What is claimed is:

1. A distiller for processing liquid influent comprising:
a heating chamber;
an evaporation arrangement positioned above the heating chamber, comprising vertically spaced apart evaporation surfaces forming a bottom evaporation stage, multiple intermediate evaporation stages, and an upper evaporation stage, the bottom evaporation stage being in thermal contact with the heating chamber, and the multiple intermediate and upper evaporation stages being sequentially positioned above the bottom evaporation stage one above another, the bottom and intermediate evaporation stages for evaporating at least a portion of the liquid influent applied thereon forming vapor and heating the stage positioned above with the vapor, at least some of the evaporation stages each include lower condensing surfaces for condensing vapor and upper evaporation surfaces heated by the vapor and for evaporating liquid influent thereon, the lower condensing surfaces including a spiral pattern that narrows moving radially outwardly for condensing the vapor into distillate for removal, the spiral pattern being below a top plate that is sealed over the spiral pattern forming a sealed spiral chamber, the top plate having upper surfaces that form said upper evaporation surfaces;
a liquid delivery system comprising at least one pump for providing the liquid influent to the upper evaporation stage for initial evaporation, and for transferring at least a portion of the liquid influent in the upper evaporation stage and the intermediate evaporation stages downwardly in sequence to a stage below until reaching the bottom evaporation stage for sequential evaporation at each evaporation stage; and
a solids transfer system comprising a wiper for moving solids on an evaporation surface of the bottom evaporation stage remaining from the evaporated liquid influent to the heating chamber for combustion and providing heat.

2. The distiller of claim 1 further comprising wiping members for wiping or scraping at least one of the liquid influent and solids on at least some of the upper evaporation surfaces for spreading or transfer.

3. The distiller of claim 2 in which the bottom evaporation stage includes a transfer port for delivering solids from the upper evaporation surface of the bottom evaporation stage to the heating chamber.

4. The distiller of claim 2 in which the liquid delivery system comprises a series of pumps for delivering the liquid influent to selected evaporation stages.

5. The distiller of claim 4 further comprising a rotatable shaft extending along an upright axis through the evaporation arrangement for rotating the wiping members and driving the pumps.

6. The distiller of claim 5 in which the heating chamber includes a heating member for providing initial heating of the heating chamber, and a combustion chamber for combustion of the solids.

7. The distiller of claim 6 further comprising a rotating combustion chamber member driven by the rotatable shaft and having solids removal members for removing buildup of solids within portions of the combustion chamber.

8. The distiller of claim 1 in which the heating chamber, evaporation arrangement, liquid delivery system and solids transfer system comprises a thermal distiller, the distiller further comprising:

a vapor compression distiller providing a first distilling step positioned above the thermal distiller, and having an influent reservoir for storing incoming liquid influent, the influent reservoir being positioned above and being heated by the evaporation arrangement of the thermal distiller through seven sequential stages from the heating chamber upwardly through the evaporation stages to the influent reservoir of the vapor compression distiller, the vapor compression distiller providing the thermal distiller with concentrated liquid influent for processing by the thermal distiller in a second distilling step.

9. The distiller of claim 1 in which the distiller is a second distiller in a compound distiller for processing liquid influent comprising:

a first distiller for distilling the liquid influent in a first distilling step and producing first distillate and concentrated liquid influent, the first distiller having a first reservoir for storing incoming liquid influent; and the second distiller being positioned below the first distiller for distilling the concentrated liquid influent received from the first distiller in a second distilling step, the second distiller comprising a second reservoir for storing the concentrated liquid influent, the heating chamber positioned above the second reservoir, the evaporation arrangement being positioned above and heated by the heating chamber for distilling the concentrated liquid influent and producing second distillate and solids, while heating the liquid influent stored in the first reservoir of the first distiller.

10. A method of processing liquid influent in a distiller comprising:

providing a heating chamber;

heating an evaporation arrangement positioned above the heating chamber with the heating chamber, the evaporation arrangement comprising vertically spaced apart evaporation surfaces forming a bottom evaporation stage, multiple intermediate evaporation stages, and an upper evaporation stage, the bottom evaporation stage being in thermal contact with the heating chamber, and the multiple and upper evaporation stages being sequentially positioned above the bottom evaporation stage one above another, at least some of the evaporation stages each include lower condensing surfaces for condensing vapor and upper evaporation surfaces heated by the vapor and for evaporating liquid influent thereon, the lower condensing surfaces including a spiral pattern that narrows moving radially outwardly for condensing the vapor into distillate for removal, the spiral pattern being below a top plate that is sealed over the spiral pattern forming a sealed spiral chamber, the top plate having upper surfaces that form said upper evaporation surfaces;

delivering the liquid influent via at least one evaporator to the upper evaporation stage for initial evaporation, and transferring at least a portion of the liquid influent in the upper evaporation stage and the intermediate evaporation stages downwardly in sequence to a stage below until reaching the bottom evaporation stage with a liquid delivery system for sequential evaporation at each evaporation stage, the bottom evaporation stage and intermediate evaporation stages evaporating at least a portion of the liquid influent applied on the bottom and intermediate evaporation stages forming vapor, and heating the stage positioned above with the vapor;

moving solids using a wiper on an evaporation surface of the bottom evaporation stage remaining from evaporated liquid influent to the heating chamber; and combusting the solids and providing heat.

11. The method of claim 10 further comprising wiping or scraping at least one of the liquid influent and solids on at least some of the upper evaporation surfaces for spreading or transfer with wiping members.

12. The method of claim 11 further comprising delivering solids from the upper evaporation surface of the bottom evaporation stage to the heating chamber through a transfer port in the bottom evaporation stage.

13. The method of claim 11 further comprising delivering the liquid influent to selected evaporation stages with a liquid delivery system that comprises a series of pumps.

14. The method of claim 13 further comprising rotating the wiping members and driving the pumps with a rotatable shaft extending through the evaporation arrangement.

15. The method of claim 14 further comprising providing initial heating of the heating chamber with a heating member, and providing a combustion chamber for combustion of the solids.

16. The method of claim 15 further comprising driving a rotating combustion chamber member having solids removal members with the rotatable shaft and removing buildup of solids within portions of the combustion chamber.

17. The method of claim 10 of which the heating chamber, evaporation arrangement, liquid delivery system and solids transfer system comprise a thermal distiller of the distiller, the method further comprising:

performing a first distilling step with a vapor compression distiller positioned above the thermal distiller, the vapor compression distiller having an influent reservoir for storing incoming liquid influent, the influent reservoir being positioned above and being heated by the evaporation arrangement of the thermal distiller through seven sequential stages from the heating chamber upwardly through the evaporation stages to the influent reservoir of the vapor compression distiller for heating the liquid influent therein; and providing the thermal distiller with concentrated liquid influent from the vapor compression distiller for processing by the thermal distiller in a second distilling step.

18. The method of processing liquid influent of claim 10 in which the distiller is a second distiller further comprising:

distilling the liquid influent with a first distiller in a first distilling step, and producing first distillate into concentrated liquid influent, the first distiller having a first reservoir for storing incoming liquid influent;

distilling the concentrated liquid influent received from the first distiller with the second distiller positioned below the first distiller in a second distilling step, the second distiller comprising a second reservoir for storing the concentrated liquid influent, the heating chamber positioned above the second reservoir, the evaporation arrangement positioned above and heated by the heating chamber for distilling the concentrated liquid influent and producing second distillate and solids while heating the liquid influent stored in the first reservoir of the first distiller.

* * * * *